United States Patent
Kim et al.

(10) Patent No.: US 9,313,817 B2
(45) Date of Patent: Apr. 12, 2016

(54) METHOD FOR PERFORMING D2D COMMUNICATION AND APPARATUS THEREFOR

(71) Applicant: LG ELECTRONICS INC., Seoul (KR)

(72) Inventors: Myoungseob Kim, Anyang-si (KR); Seungmin Lee, Anyang-si (KR); Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/647,694

(22) PCT Filed: Nov. 28, 2013

(86) PCT No.: PCT/KR2013/010901
§ 371 (c)(1),
(2) Date: May 27, 2015

(87) PCT Pub. No.: WO2014/084626
PCT Pub. Date: Jun. 5, 2014

(65) Prior Publication Data
US 2015/0296551 A1 Oct. 15, 2015

Related U.S. Application Data

(60) Provisional application No. 61/730,956, filed on Nov. 28, 2012.

(51) Int. Cl.
| | |
|---|---|
| *H04W 4/00* | (2009.01) |
| *H04W 76/02* | (2009.01) |
| *H04W 60/00* | (2009.01) |
| *H04W 4/02* | (2009.01) |
| *H04W 8/00* | (2009.01) |
| *H04W 8/02* | (2009.01) |

(Continued)

(52) U.S. Cl.
CPC ............ *H04W 76/023* (2013.01); *H04W 4/021* (2013.01); *H04W 8/005* (2013.01); *H04W 8/02* (2013.01); *H04W 60/00* (2013.01); *H04W 60/04* (2013.01); *H04W 68/005* (2013.01)

(58) Field of Classification Search
CPC ... H04W 76/023; H04W 4/005; H04W 8/005; H04W 24/04; H04W 76/02; H04W 36/0016; H04W 72/04; H04W 48/18; H04L 43/10
USPC ...................................................... 455/426.1
See application file for complete search history.

(56) References Cited

U.S. PATENT DOCUMENTS

| | | |
|---|---|---|
| 2011/0096721 A1 | 4/2011 | Kamalaraj et al. |
| 2011/0098043 A1 | 4/2011 | Yu et al. |

(Continued)

FOREIGN PATENT DOCUMENTS

| | | | |
|---|---|---|---|
| KR | 10-2011-0037002 A | 4/2011 | |
| KR | 10-2011-0083538 A | 7/2011 | |

*Primary Examiner* — Don N Vo
(74) *Attorney, Agent, or Firm* — Birch, Stewart, Kolasch & Birch, LLP

(57) ABSTRACT

The present invention relates to a wireless communication system. In particular, provided are a method for managing, by a terminal, mobility in a wireless communication system, and an apparatus therefore, including the steps of: receiving a plurality of TA lists, wherein the plurality of TA lists include dedicated TA lists and shared TA lists; and when TA information of a current cell matches with the shared TA lists, selectively performing a TAU process according to a communication mode, wherein when the communication mode is a non-D2D, the TAU process is performed on an MME corresponding to the TA information about the current cell, and when the communication mode is D2D, the TAU process is skipped.

12 Claims, 13 Drawing Sheets

(51) Int. Cl.
  *H04W 60/04* (2009.01)
  *H04W 68/00* (2009.01)

(56) References Cited

U.S. PATENT DOCUMENTS

| | | |
|---|---|---|
| 2011/0317569 A1 | 12/2011 | Kneckt et al. |
| 2012/0196599 A1 | 8/2012 | Cho et al. |
| 2012/0309419 A1 | 12/2012 | Lee et al. |
| 2013/0109301 A1 * | 5/2013 | Hakola ............... H04W 76/023 455/39 |
| 2014/0066058 A1 * | 3/2014 | Yu ........................ H04L 67/16 455/434 |
| 2015/0131571 A1 * | 5/2015 | Fodor .................... H04W 8/005 370/329 |

* cited by examiner

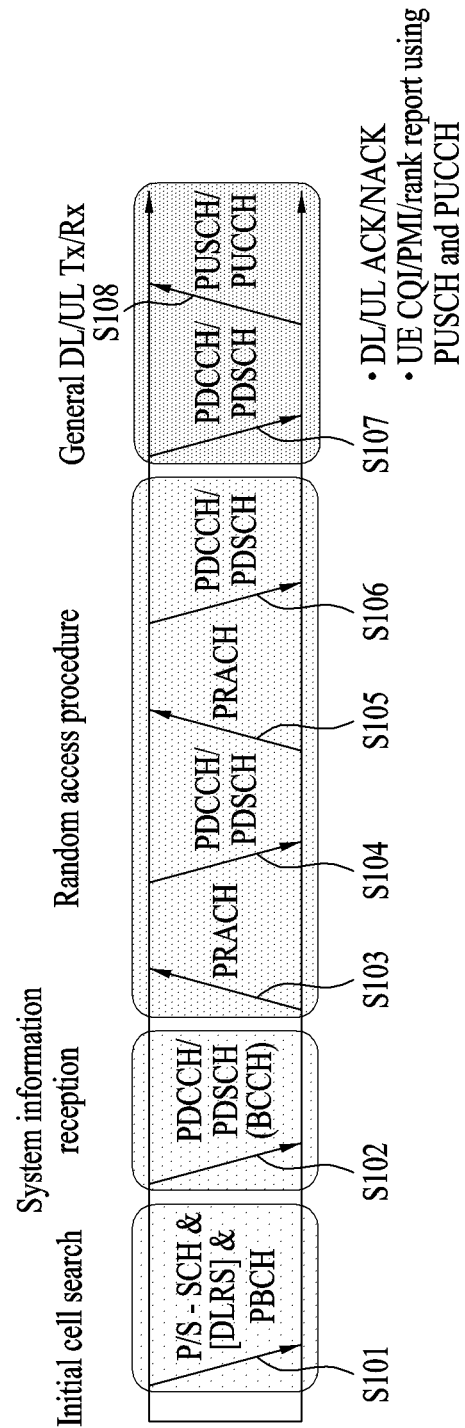

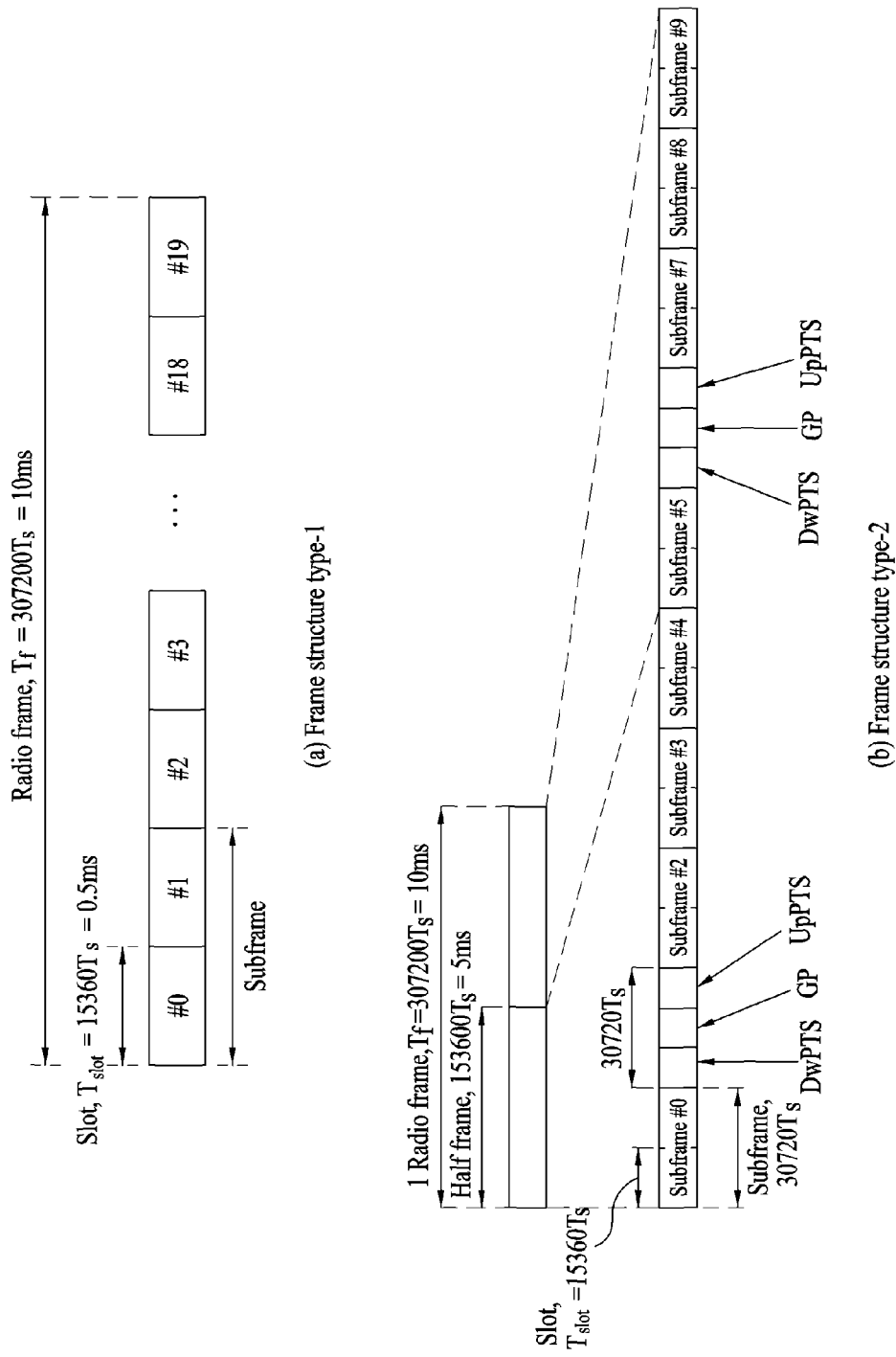

FIG. 12
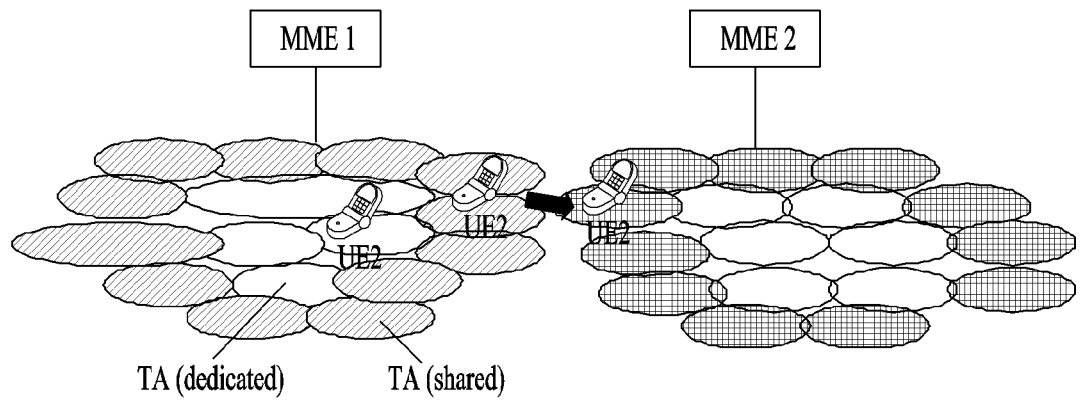
TA (dedicated)   TA (shared)
FIG. 13
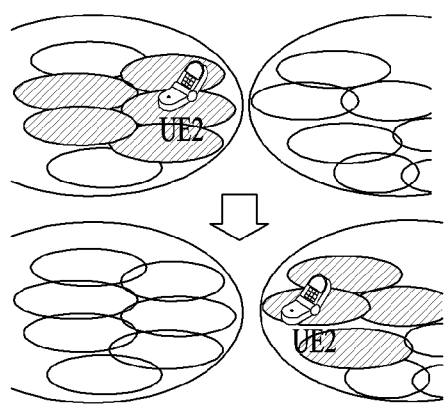 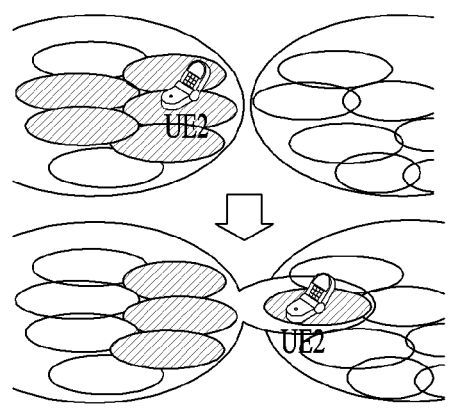
(a) Case of changing MME        (b) Case of not changing MME

METHOD FOR PERFORMING D2D COMMUNICATION AND APPARATUS THEREFOR

CROSS REFERENCE TO RELATED APPLICATIONS

This application is the National Phase of PCT International Application No. PCT/KR2013/010901, filed on Nov. 28, 2013, which claims priority under 35 U.S.C. 119(e) to U.S. Provisional Application No. 61/730,956, filed on Nov. 28, 2012, all of which are hereby expressly incorporated by reference into the present application.

TECHNICAL FIELD

The present invention relates to a wireless communication system, and more particularly, to a method of performing a D2D communication and an apparatus therefore.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE OF THE INVENTION

Technical Task

An object of the present invention is to provide a method of efficiently performing a D2D (device to device) communication in a wireless communication system and an apparatus therefore.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of managing mobility by a user equipment in a wireless communication system, include the steps of receiving a list of a plurality of TAs (tracking areas), in this case, the list of a plurality of the TAs comprises a dedicated TA list and a shared TA list, and if TA information of a current cell is matched with the shared TA list, selectively performing a TAU (tracking area update) process according to a communication mode. In this case, if the communication mode corresponds to a non-D2D (device to device) mode, the TAU process is performed for an MME (mobility management entity) corresponding to the TA information of the current cell and if the communication mode corresponds to a D2D mode, the TAU process is skipped.

To further achieve these and other advantages and in accordance with the purpose of the present invention, according to a different embodiment, a user equipment for use in a wireless communication system includes an RF (radio frequency) unit and a processor, the processor configured to receive a list of a plurality of TAs (tracking areas), in this case, the list of a plurality of the TAs includes a dedicated TA list and a shared TA list, the processor, if TA information of a current cell is matched with the shared TA list, configured to selectively perform a TAU (tracking area update) process according to a communication mode. In this case, if the communication mode corresponds to a non-D2D (device to device) mode, the TAU process is performed for an MME (mobility management entity) corresponding to the TA information of the current cell and if the communication mode corresponds to a D2D mode, the TAU process is skipped.

Preferably, the dedicated TA list includes TA information indicating the user equipment belonging to a registered MME only and the shared TA list can include TA information indicating the user equipment shared between the registered MME and a neighboring MME.

Preferably, the shared TA list includes a plurality of first TAIs (TA identities) and each of a plurality of the first TAIs may correspond to a single eNode B (eNB) or a cell.

Preferably, the dedicated TA list includes a plurality of second TAIs (TA identities), each of a plurality of the second TAIs corresponds to a single TA and each TA may include a plurality of eNBs.

Preferably, if the TA information of the current cell is matched with the shared TA list, a process of receiving a paging message is performed in consideration of a communication mode, if the communication mode corresponds to the non-D2D mode, the paging message is received from an MME corresponding to the TA information of the current cell and if the communication mode corresponds to the D2D mode, the paging message can be received from an MME corresponding to the dedicated TA.

Preferably, if the TA information of the current cell is matched with the shared TA list, a process of receiving a paging message is performed in consideration of a communication mode, if the communication mode corresponds to the non-D2D mode, the paging message is received from an MME corresponding to the TA information of the current cell and if the communication mode corresponds to the D2D mode, the paging message can be received from a peer D2D user equipment.

Advantageous Effects

According to the present invention, it is able to efficiently perform a D2D (device to device) communication in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 4 is a diagram for explaining an example of physical channels used for LTE (-A) system and a general signal transmission method using the same;

FIG. 5 is a diagram for an example of a radio frame structure used in LTE (-A) system;

FIGS. 11 to 15 are diagrams for a TAU according to the present invention;

BEST MODE

Mode for Invention

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA and employs OFDMA in downlink and SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. And, specific terminologies used in the following description are provided to help the present invention to be understood. The specific terminologies can be modified into a different form within a range not deviating from a technical idea of the present invention.

Figure 1:
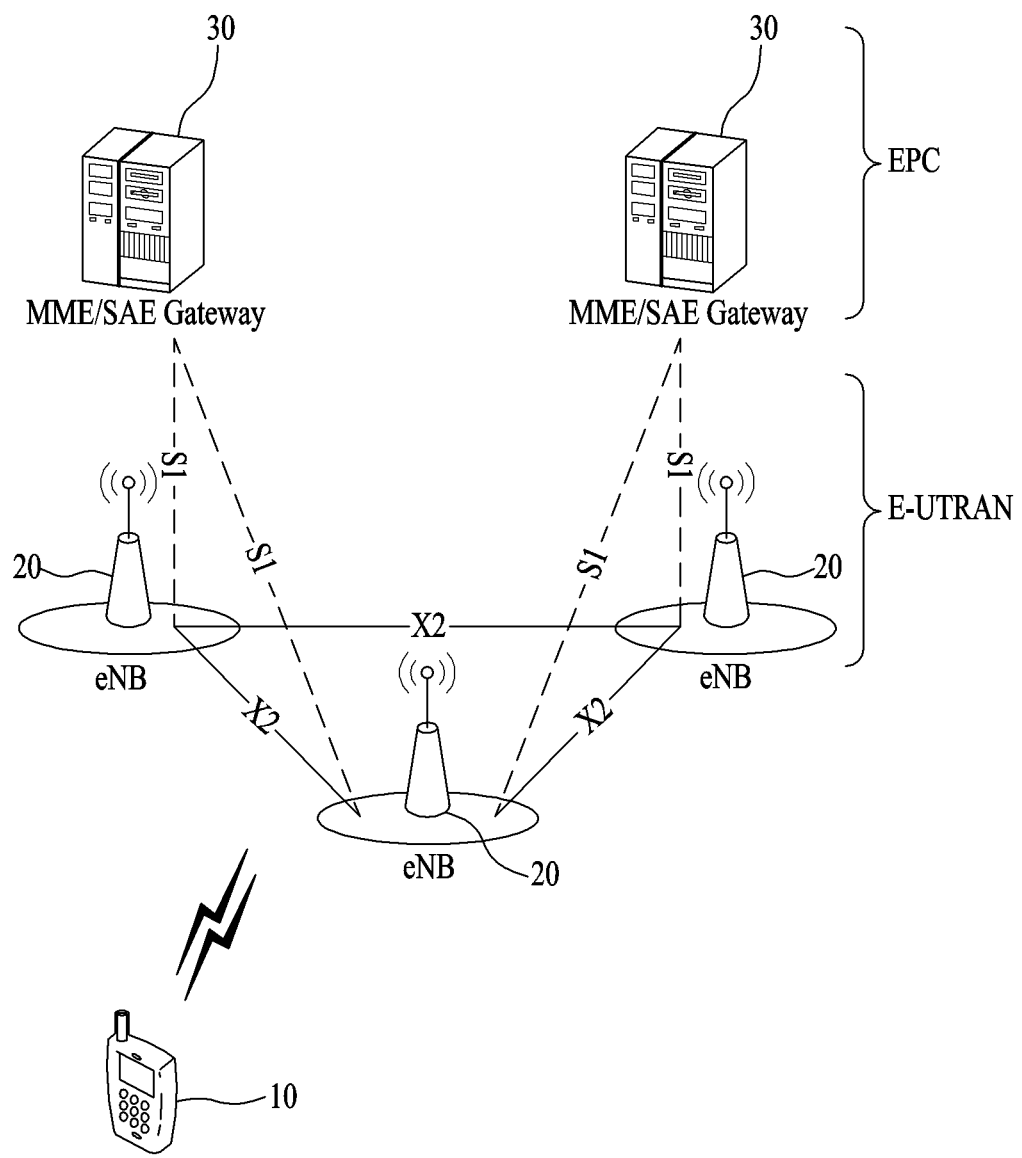
FIG. 1 is a diagram for an example of a network structure of E-UMTS (evolved universal mobile telecommunication system)

FIG. 1 illustrates a network structure of an E-UMTS. The E-UMTS may be also referred to as an LTE (-A) system. The E-UMTS is widely deployed to provide a variety of communication services such as voice and packet data.

As shown in FIG. 1, E-UMTS network includes an E-UTRAN (evolved universal terrestrial radio access network), an EPC (enhanced packet core) and one or more user equipments. The E-UTRAN can include one or more node Bs (eNBs) 20 and a plurality of user equipments (UEs) 10 can be positioned in a single cell. One or more E-TRAN MME (mobility management entity)/SAE (system architecture evolution) gateways 30 can be connected with an external network in a manner of being positioned at an end of a network. A UE 10 corresponds to a communication device carried by a user.

An eNode B (eNB) 20 provides an end point of a user plane and a control plane to the UE 10. The MME/SAE gateway 30 provides an end point of a session and mobility management function to the UE 10. The eNB 20 and the MME/SAE gateway 30 can be connected with each other via an Si interface. The eNB 20 corresponds to a fixed station communicating with the UE 10. The eNB 20 can be allocated to each cell. An interface configured to transmit a user traffic or a control traffic can be used between eNBs 20.

The MME provides various functions including distribution of a paging message distributed by the eNBs 20, security control, mobility control in an idle state, SAE bearer control and encryption and integrity protection of NAS (non-access layer signaling). An SAE gateway host provides various functions including termination of a U-plane packet for a paging occasion and U-plane switching supporting user 10 mobility. The mobility of the UE is managed in a TA (tracking area) unit. The TA consists of a plurality of cells. If the UE moves from a specific TA to a different TA, the UE informs a network that a TA at which the UE is positioned has changed.

For clarity, the MME/SAE gateway 30 is simply called a "gateway" in the present specification. Yet, the MME/SAE gateway 30 includes both the MME and the SAE gateway. A plurality of network nodes can be connected with each other between the eNB 20 and the MME/SAE gateway 30 via the S1 interface. The eNBs 20 can access one another via an X2 interface and may have a mesh network structure.

Figure 2:
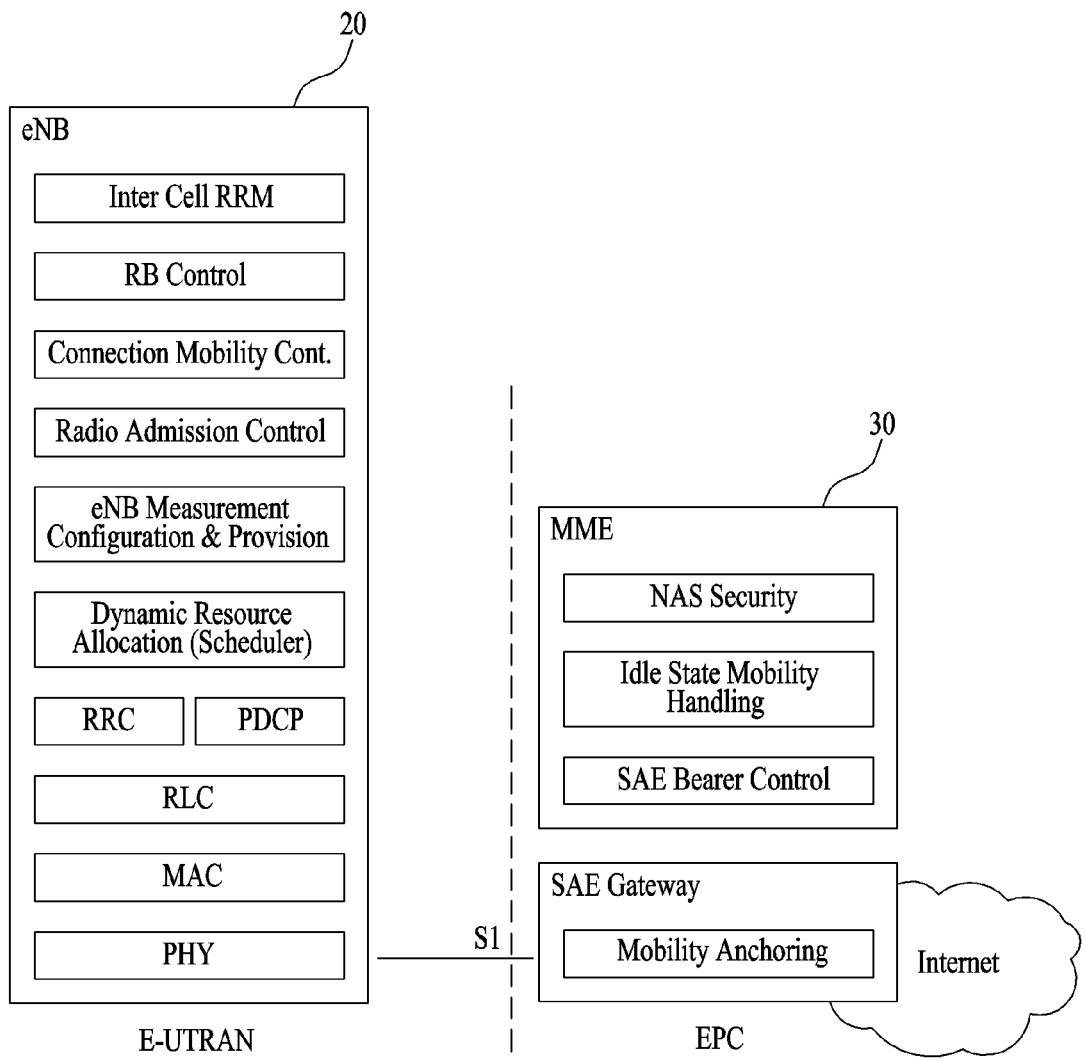
FIG. 2 is a diagram for an example of E-UTRAN (evolved universal terrestrial radio access network) and a structure of a gateway 30.

FIG. 2 is a diagram for an example of E-UTRAN (evolved universal terrestrial radio access network) and a structure of a gateway 30. As shown in FIG. 2, an eNB 20 can perform functions such as selecting a gateway 30, routing to the gateway while an RRC (radio resource control) is activated, scheduling and transmitting a paging message, scheduling and transmitting broadcast channel (BCCH) information, dynamic resource allocation for UEs 10 in uplink and downlink, configuring and preparing eNB measurement, controlling a radio bearer, radio admission control (RAC) and connection mobility control in LTE_ACTIVE state. In the EPC (enhanced packet core), the gateway 30 can perform functions such as sending a page, managing LTE_IDLE state, encryption of a user plane, controlling a radio bearer and encryption and integrity protection of NAS (non-access layer signaling).

Figure 3A:
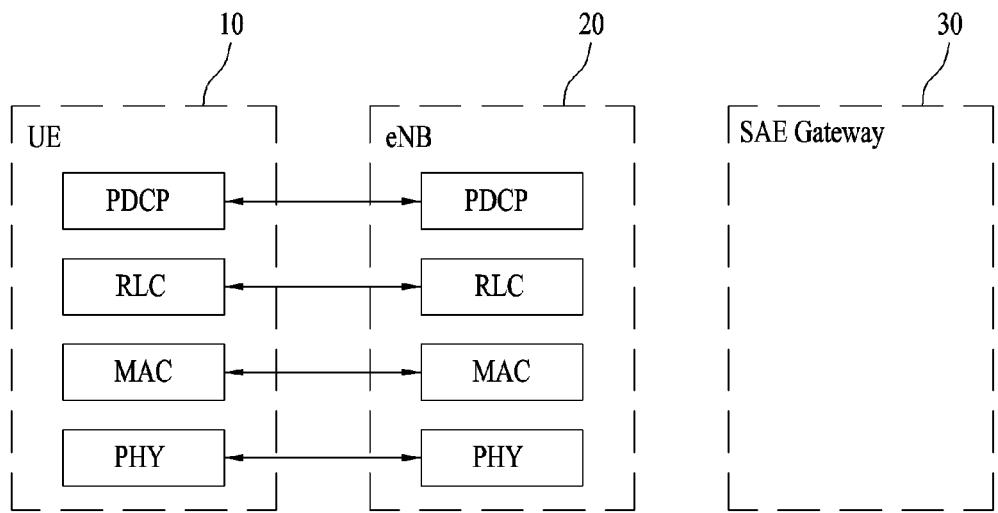
FIGS. 3A and 3B are diagrams for an example of a user-plane protocol and a control-plane protocol for E-UMTS.
Figure 3B:
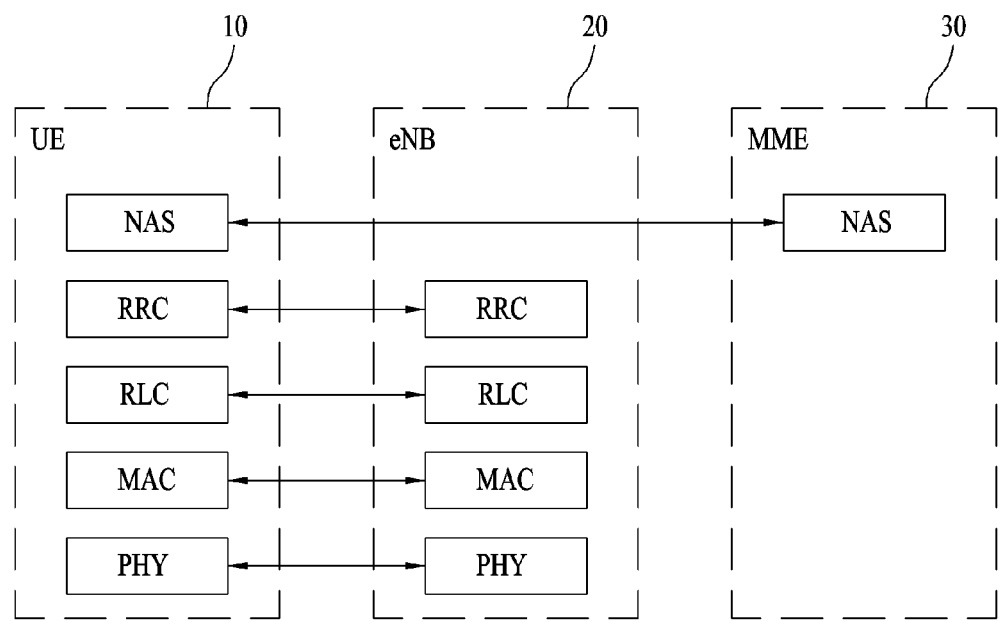

FIGS. 3A and 3B illustrate the user-plane protocol and the control-plane protocol stack for the E-UMTS network. With reference to FIGS. 3A and 3B, the protocol layers may be divided into a first layer (L1), a second layer (L2) and a third layer (L3) based upon the three lower layers of an Open System Interconnection (OSI) standard model.

The first layer L1 (or physical layer, PHY) provides an information transmission service to an upper layer using a physical channel. The physical layer is connected with a Medium Access Control (MAC) layer through a transport channel, and data between the MAC layer and the physical layer are transferred via the transport channel. Between different physical layers, namely, between physical layers of a transmission side and a reception side, data are transferred via the physical channel.

The MAC layer of the second layer (L2) provides a service to a radio link control (RLC) layer, which is a higher layer, via a logical channel. The RLC layer of the second layer (L2) supports trustworthy data transmission. If the MAC layer performs the RLC function, the RLC layer is not separated required.

The Packet Data Convergence Protocol (PDCP) layer of Layer 2 (L2) performs a header compression function that reduces unnecessary control information such that data being transmitted by employing Internet Protocol (IP) packets, such as IPv4 or IPv6, can be efficiently sent over a radio (wireless) interface that has a relatively narrow bandwidth.

A Radio Resource Control (RRC) layer located at the lowest portion of the third layer (L3) is typically only defined in the control plane and controls logical channels, transport channels and the physical channels in relation to the configuration, reconfiguration, and release of the Radio Bearers (RBs). The RB means a service provided by the second layer (L2) for data transmission between the terminal and the E-UTRAN.

With reference to FIG. 3a, the RLC and MAC layers (terminated in an eNB 20 on the network side) may perform functions such as scheduling, Automatic Repeat reQuest (ARQ), and Hybrid ARQ (HARQ). The PDCP layer (terminated in eNB 20 on the network side) may perform functions such as header compression, integrity protection, and ciphering.

With reference to FIG. 3b, the RLC and MAC layers (terminated in an eNB 20 on the network side) perform the same or similar functions as for the control plane. The RRC layer (terminated in an eNB 20 on the network side) may perform functions such as broadcasting, paging, RRC connection management, RB control, mobility functions, and UE measurement reporting and controlling. The NAS control protocol (terminated in the MME 30 on the network side) may perform functions such as a SAE bearer management, authentication, LTE_IDLE mobility handling, paging origination in LTE_IDLE, and security control for the signaling between the gateway and UE 10.

The NAS control protocol may use three different states. A LTE_DETACHED state is used if there is no RRC entity. A LTE_IDLE state is used if there is no RRC connection while storing minimal UE information. An LTE_ACTIVE state is used if the RRC connection is established. Also, RRC state may be divided into two different states such as an RRC_IDLE state and an RRC_CONNECTED state.

In the RRC_IDLE state, the UE 10 may receive broadcasts of system information and paging information while the UE specifies a Discontinuous Reception (DRX) configured by NAS, and the UE has been allocated an identification (ID) which uniquely identifies the UE in a tracking area. In the RRC-IDLE state, no RRC context is stored in the eNB.

In the RRC_CONNECTED state, the UE 10 has an E-UTRAN RRC connection and a RRC context is stored in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover) of the UE, and cell measurement for a neighboring cell can be performed.

In RRC_CONNECTED state, the UE 10 specifies a paging DRX cycle. The UE 10 monitors a paging signal on a specific paging occasion in every UE-specific paging DRX cycle.

FIG. 4 is a diagram for explaining an example of physical channels used for LTE (-A) system and a general signal transmission method using the same.

Referring to FIG. 4, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the base station, may match synchronization with the base station and may then obtain information such as a cell ID and the like. Subsequently, the user equipment may receive a physical broadcast channel (PBCH) from the base station and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Subsequently, the user equipment may be able to perform a random access procedure to complete the access to the base station [S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random access channel and a channel reception [S106] of a physical downlink control channel and a corresponding physical downlink shared channel.

Having performed the above-mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure.

FIG. 5 is a diagram for explaining an example of a structure of a radio frame in LTE (-A) system. UL/DL (uplink/downlink) data packet transmission is performed by a unit of subframe. And, one subframe is defined as a time interval including a plurality of symbols. In the LTE (-A) standard, a type-1 radio frame structure applicable to FDD (frequency division duplex) and a type-2 radio frame structure applicable to TDD (time division duplex) are supported.

FIG. 5 (a) is a diagram for an example of a structure of a type 1 radio frame. A DL (downlink) radio frame includes 10 subframes. Each of the subframes includes 2 slots in time domain. For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE (-A) system uses OFDM in downlink, OFDM symbol is provided to indicate one symbol period. The OFDM symbol may be named SC-FDMA symbol or symbol period. Resource block (RB) is a resource allocation unit and may include a plurality of contiguous subcarriers in one slot.

The number of OFDM symbols included in one slot may vary in accordance with a configuration of a CP (cyclic prefix configuration). The CP may be categorized into an extended CP and a normal CP. For instance, in case that OFDM symbols are configured by the normal CP, the number of OFDM symbols included in one slot may correspond to 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may correspond to 6. If a channel status is unstable (e.g., a UE is moving at high speed), it may be able to use the extended CP to further reduce inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 5 (b) is a diagram for a structure of a type 2 radio frame. The type-2 radio frame includes 2 half frames. Each of the half frame includes 4 (5) normal subframes and 1 (0) special subframe. The normal subframe may be used for UL or DL according to an uplink-downlink configuration. Each of subframes includes 2 slots.

Figure 6:
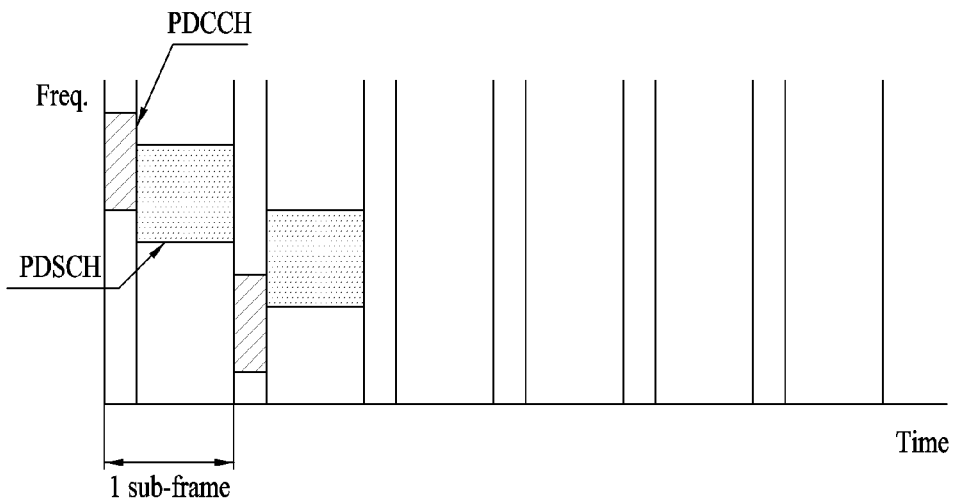
FIG. 6 is a diagram for an example of a structure of a downlink subframe.

FIG. 6 is a diagram for an example of a structure of a downlink subframe.

FIG. 6 is a diagram for an example of a structure of a downlink subframe.

Referring to FIG. 4, maximum 3 (4) OFDM symbols situated in a head part of a first slot of one subframe correspond to a control region to which control channels are allocated. The rest of OFDM symbols correspond to a data region to which PDSCH (physical downlink shared channel) is assigned. Examples of DL control channels used by LTE (-A) may include PCFICH (Physical Control Format Indicator Channel), PDCCH (Physical Downlink Control Channel), PHICH (Physical hybrid ARQ indicator Channel) and the like. The PHICH is assigned to 3 REGs, which are maximally distributed in a frequency domain.

PDCCH is assigned to first n number of OFDM symbols of a subframe (hereinafter called a control region). In this case, the n corresponds to an integer equal to or greater than 1. The n is indicated by PCFICH. Control information carried on PDCCH may be called downlink control information (DCI). A DCI format is defined by formats of 0, 3, 3A, and 4 for uplink and the DCI format is defined by formats of 1, 1A, 1B, 1C, 1D, 2, 2A, 2B, 2C and the like for downlink. For instance, the DCI format may be able to selectively include such information as a hopping flag, RB allocation, an MCS (modulation coding scheme), an RV (redundancy version), an NDI (new data indicator), a TPC (transmit power control), a cyclic shift DM-RS (demodulation reference signal), a CSI (channel state information) request, a HARQ process number, a TPMI (transmitted precoding matrix indicator), PMI (precoding matrix indicator) confirmation and the like according to a usage.

PDCCH is able to carry a transmission format of DL-SCH (downlink shared channel) and resource allocation information, a transmission format of UL-SCH (uplink shared channel) and resource allocation information, paging information on PCH (paging channel), system information on DL-SCH, resource allocation information of a higher layer control message such as a random access response transmitted on PDSCH, a transmit power control command set for individual user equipments within a user equipment group, a transmit power control command, indication information activating VoIP (voice over IP) and the like. A base station determines a PDCCH format in accordance with DCI to be transmitted to a user equipment and attaches a CRC (cyclic redundancy check) to control information. The CRC is masked with a unique identifier (RNTI (radio network temporary identifier)) in accordance with an owner or usage of PDCCH. If the PDCCH is provided for a specific user equipment, the CRC can be masked with a unique identifier of the user equipment, i.e., C-RNTI (i.e., Cell-RNTI). As a different example, if the PDCCH is provided for a paging message, the CRC can be masked with a paging identifier (e.g., P-RNTI (Paging-RNTI)). If the PDCCH is provided for system information, the CRC can be masked with a system information identifier (e.g., SI-RNTI (system information-RNTI). If PDCCH is used for a random access response, the CRC can be masked with RA-RNTI (random access-RNTI).

Figure 7:
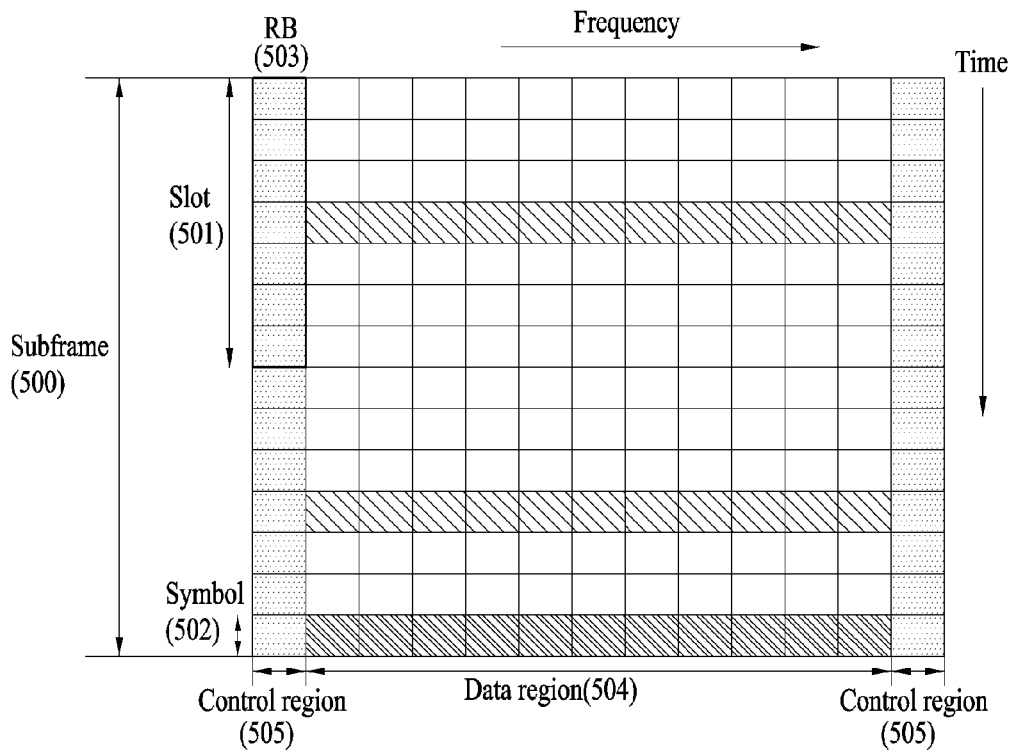
FIG. 7 is a diagram for an example of a structure of an uplink subframe.

FIG. 7 is a diagram for an example of a structure of an uplink subframe.

Referring to FIG. 7, a subframe 500 of 1-ms length includes two 0.5 ms-length slots 501. A slot may include a different number of SC-FDMA (single carrier frequency division multiple access) symbols according to a length of a CP (cyclic prefix). For instance, in case of a normal CP, a slot may include 7 SC-FDMA symbols. In case of an extended CP, a slot may include 6 SC-FDMA symbols. A resource block 503 is a resource allocation unit corresponding to 12 subcarriers in frequency domain and one slot in time domain. An uplink subframe structure is divided into a data region 504 and a control region 505. The data region includes PUSCH (physical uplink shared channel) and is used for transmitting a data signal such as audio and the like. The control region includes PUCCH (Physical Uplink Control Channel) and is used for transmitting UCI (uplink control information). The PUCCH includes an RB (resource block) pair positioned at both ends of the data region in a frequency axis and hops on a slot boundary.

The PUCCH can be used for transmitting control information described in the following.

SR (Scheduling Request): information used to request uplink UL-SCH resource. The SR is transmitted using an on-off keying (OOK) system.

HARQ ACK/NACK: a response signal transmitted in response to a downlink data. It represents whether the downlink data is successfully received. ACK/NACK 1 bit is transmitted in response to a single codeword and ACK/NACK 2 bits are transmitted in response to two codewords.

CSI (Channel State Information): feedback information on a downlink channel. For instance, the CSI includes CQI (Channel Quality Indicator). MIMO (Multiple Input Multiple Output) related feedback information includes a rank. indicator (RI), a precoding matrix indicator (PMI), a precoding type indicator (PTI), etc. 20 bits are used per subframe. A periodic CSI (p-CSI) is periodically transmitted via PUCCH according to a period/offset configured by upper layer. Meanwhile, an aperiodic CSI (a-CSI) is aperiodically transmitted according to a command of an eNB.

Figure 8:
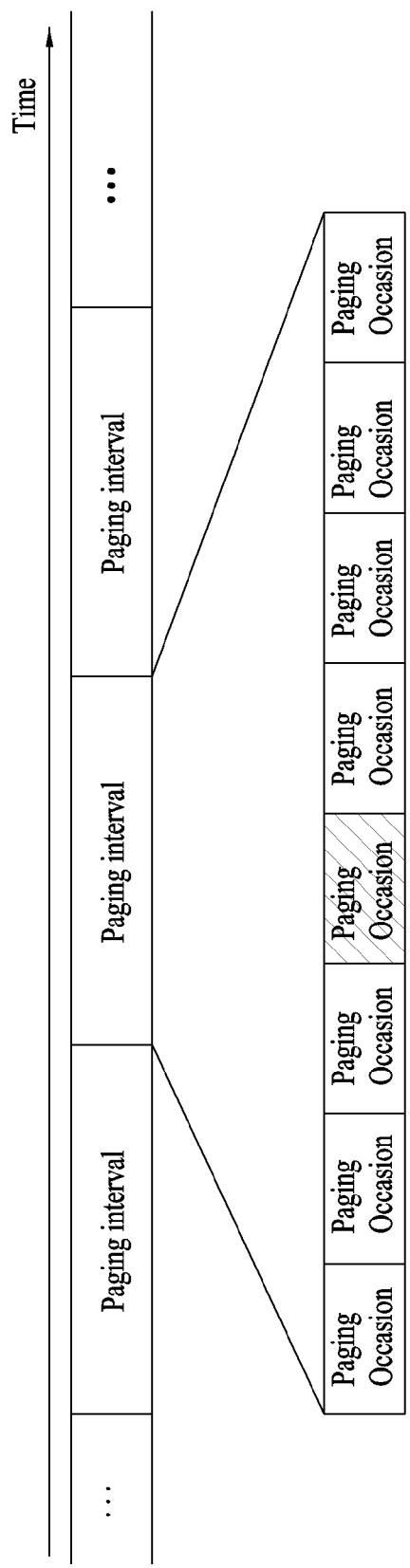
FIG. 8 is a diagram for an example of transmitting a paging channel used for E-UMTS system.

FIG. 8 is a diagram for an example of transmitting a paging channel used for E-UMTS system. When a paging message is received, a user equipment may be able to perform a discontinuous reception (DRX) cycle for the purpose of power consumption reduction. To this end, a network may configure a plurality of paging occasions (PO) on every time cycle, which is called a paging cycle (paging DRX cycle) and a specific user equipment can obtain a paging message by receiving a specific paging occasion only. Specifically, the user equipment wakes up on a designated paging occasion and receives PDCCH. If the user equipment receives a P-RNTI (paging-RNTI) corresponding to paging via the received PDCCH, the user equipment receives PDSCH indicated by the PDCCH. An actual paging message is transmitted via the PDSCH. If there exists an indicator matched with an indicator (e.g., IMSI (international mobile subscriber identity)) of the user equipment in the paging message, the user equipment informs a higher layer that paging has arrived. The user equipment does not receive a paging channel except time of the designated specific paging occasion. One paging occasion corresponds to a TTI (e.g., subframe).

Embodiment: D2D (Device to Device) Communication

Figure 9:
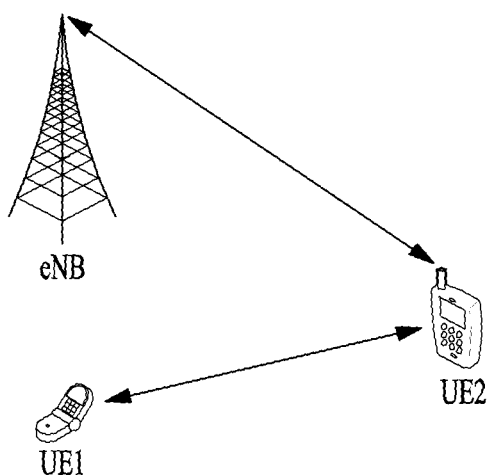
FIG. 9 is a diagram for an example of a D2D (device to device) communication system.

FIG. 9 is a diagram for an example of a D2D (device to device) communication system. A D2D communication indicates a direct communication technology between terminals. A radio link is established between a pair of a transmitting end and a receiving end (i.e., D2D peer) and a direct communication is performed by the D2D technology. By doing so, a reuse rate of a radio resource can be enhanced, thereby increasing band efficiency. As shown in FIG. 9, a user equipment 2 (UE 2) can directly communicate with a user equipment 1 (UE 1) without passing through a network (e.g., eNB) (UE to UE communication/link). And, the UE 2 can perform a direct communication with the eNB according to a legacy scheme (UE to eNB link/communication). For the D2D communication, a D2D UE discovers a different D2D UE via a D2D discovery process and may be able to establish a D2D link. In this case, the UE to UE communication/link indicates a UE to UE communication or a UE to UE link. The UE to UE communication and the UE to UE link can be used in a manner of being mixed. A UE performing the D2D communication (hereinafter, D2D UE) can be classified into a server UE and a client UE according to a service. For instance, the UE 2 operates as the server UE and the UE 1 operates as the client UE in FIG. 9.

Figure 10:
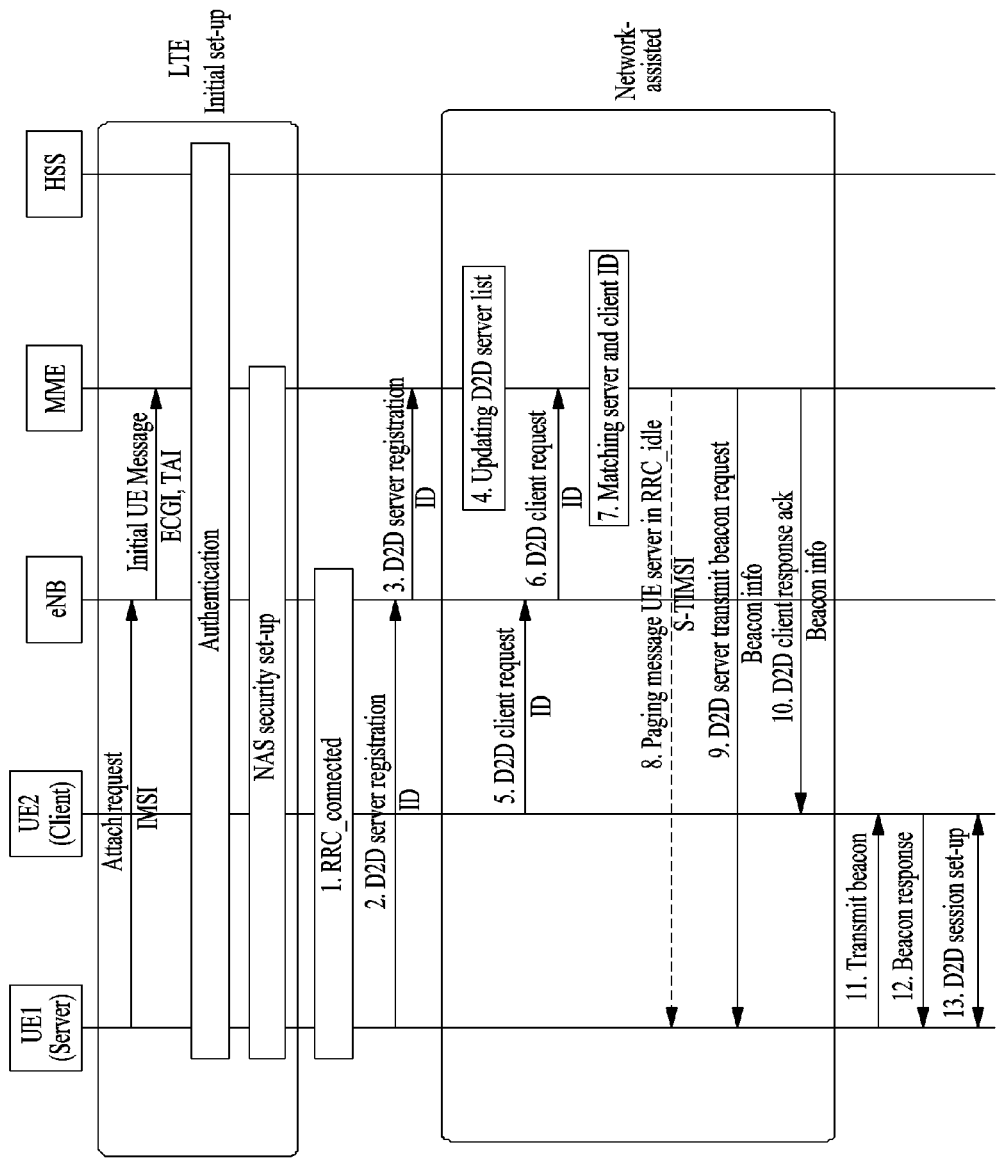
FIG. 10 is a diagram for an example of a D2D discovery process.

FIG. 10 is a diagram for an example of a D2D discovery process for D2D. The present example shows an example that a D2D UE is discovered in a manner of being registered at an MME in advance (priori-registration scheme).

Referring to FIG. 10, a server UE (UE 1) among D2D UEs can register at an MME in RRC_connected state. To this end, the server UE transmits a D2D server registration request message to an eNB (step 2) and the eNB can deliver the D2D server registration request message to the MME (step 3). The D2D server registration request message can include identification information (e.g., a server ID, a UE ID, a D2D group ID, a service ID and the like) necessary for a D2D communication. The MME can update a D2D server list using the D2D server registration request message (step 4). Subsequently, a client UE (UE 2) can request D2D to the D2D server UE belonging to an identical network (steps 5 to 6). Specifically, the client UE transmits a D2D request message to an eNB (step 5) and the eNB can deliver the D2D request message to the MME (step 6). The D2D request message can include identification information (e.g., a client ID, a UE ID, a D2D group ID, a service ID and the like) necessary for a D2D communication. If there exists a server UE corresponding to the D2D request (step 7), the MME can ask the server UE to transmit a D2D discovery signal (steps 8 to 9) and may be able to ask the client UE to receive the D2D discovery signal (step 10). Specifically, if the server UE is in an idle state, the MME informs the server UE that there exists a D2D request via a paging message (step 8) and may be then able to transmit a beacon request message (step 9). The beacon request message can include information on a beacon transmission resource (e.g., a sequence index, a time-frequency resource, a transmission interval and the like). In this case, a beacon signal is used for a purpose of discovery. Subsequently, the MME can transmit a response message to the client UE in response to the D2D request message (step 10). In this case, the response message can include information on a resource (e.g., a sequence index, a time-frequency resource, a transmission interval and the like) used for receiving the beacon signal which is received by a D2D server. Subsequently, the server UE and the client UE discover one another based on the beacon signal (steps 11 to 12) and may be able to setup a D2D communication session (step 13).

Figure 11:
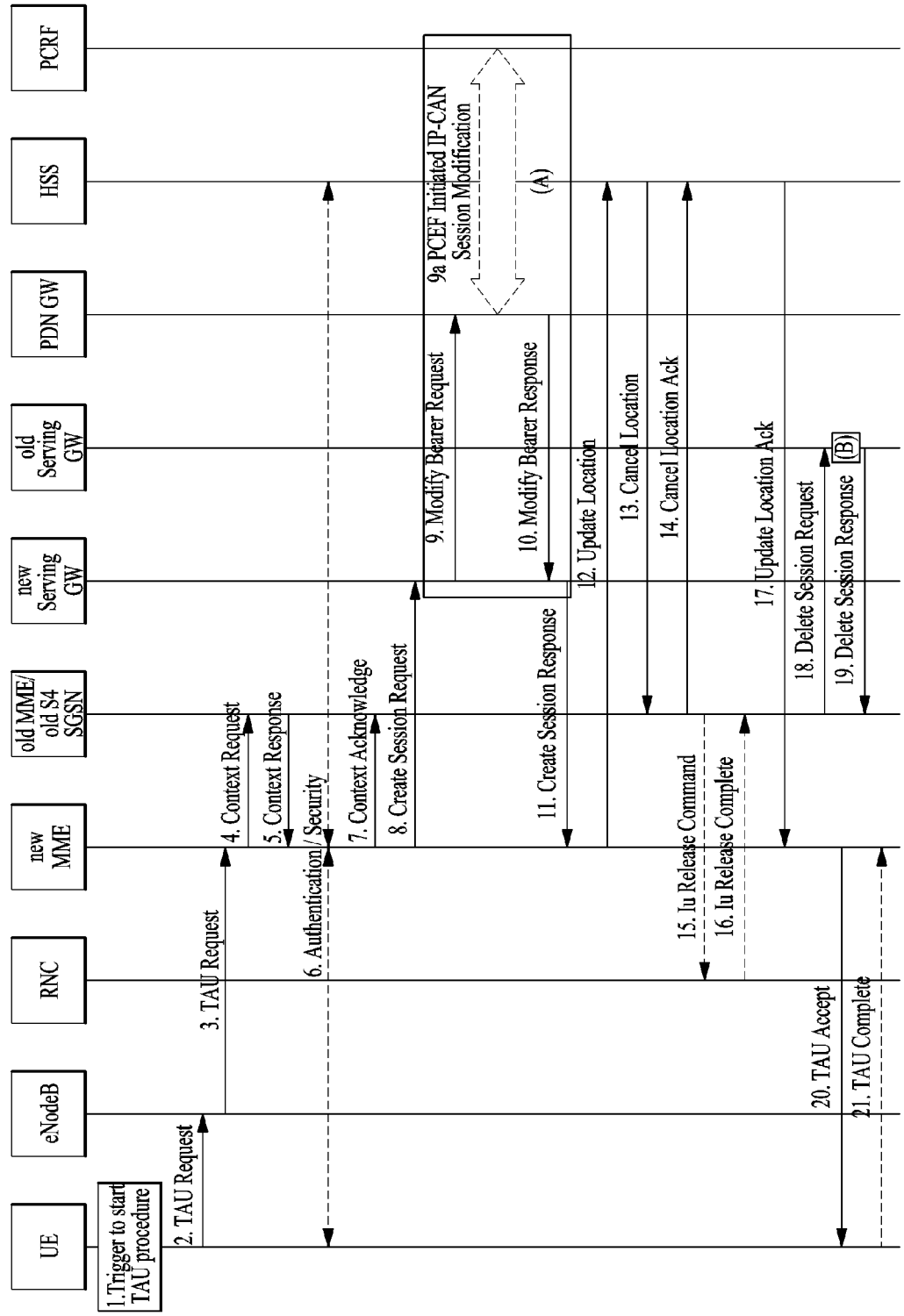
FIG. 11 is a diagram for an example of a TAU (tracking area update) process.

Meanwhile, if the server UE has mobility in an idle state, the server UE is able to move to a neighboring cell or a neighboring TA (tracking area). In some cases the server UE is able to move to coverage of a neighboring MME. In this case, the two UEs are considered as being positioned at networks different from each other. Hence, it may be difficult to transmit a paging message or a paging message can be transmitted after experiencing long delay time and a complex procedure. In FIG. 11, an example of a process of changing TAU (tracking area update)/MME is shown. A UE has a TA list of registered networks. If the UE enters a TA not included in the TA list, the UE performs TA update. In this case, MME change can also be performed together with the TA update. The TA list corresponds to a TAI (TA identity) list. TAs included in the TA list are managed by an identical MME. The TAI indicates TA identification information. In general, one TA includes a plurality of eNBs. In FIG. 11, if the MME is not modified, the steps 4, 5, 7 and 12 to 17 are omitted.

Meanwhile, if a UE in which mobility has occurred registers at a new MME, the UE may be able to use a legacy process or a process newly defined for D2D. As an example of the process newly defined for D2D, at least a part of procedures directly performed by the UE to register at the MME is omitted and UE context can be shared with each other between MMES. Yet, although an MME registration procedure is simplified, if the UE registers at a new MME, there exist many demerits including additional signaling between MME, latency necessary for the new MME to transmit a signal to the UE, and the like. Hence, in order to solve the aforementioned problem, if mobility to a neighboring MME occurs in a UE positioned at a boundary area between MMES, it may consider a method of making the UE more stay at a legacy network. In this case, in order to stay at a legacy MME, the UE may not immediately reselect an MME when the UE has moved to a TA of the neighboring MME. As an example, MME reselection can be restricted to be performed only when an MME resection condition (e.g., a condition based on signal strength of an eNB belonging to each MME) is maintained for more than prescribed time. The UE can perform a D2D operation via schemes described in the following while staying in the legacy network during the MME reselection does not occur.

As a first scheme, it may consider a scheme of making a UE recognize a TA of a new MME as a TA of a legacy MME in case of updating a TA (TAU) in a manner of sharing TAs different from each other between MMEs. Basically, when a TA changes due to mobility of a UE, if the UE moves to a TA not included in a TA list received from an eNB, the UE attempts the TAU. If the UE moves to a TA belonging to a new MME, the UE requests the TAU to the new MME and performs an operation of receiving a new TA list (Refer to FIG. 11). In this case, since D2D UEs belong to networks different from each other, it is difficult for the D2D UEs to perform a normal D2D operation (e.g., UE discovery). Hence, it is necessary to make the TAU to be performed in a legacy MME. To this end, partial TA information can be shared with each other between MMEs. The TA information can be shared with each other between MMEs in a manner that the MMEs share information on an eNB of a counterpart MME with each other. Moreover, an eNB can select an MME from an MME pool corresponding to a range capable of selecting an MME appropriate for each UE. For instance, as shown in FIG. 12, TAs of an MME can be divided into an area dedicated to a corresponding MME only (hereinafter, dedicated TA) and an area (hereinafter, shared TA) shared with different MMEs (to reduce frequency of occurring mobility between MMEs). Referring to FIG. 12, the UE 2 has moves to a TA located at a shared area of MME 2 from a TA located at a shared area of an MME 1 due to occurrence of mobility. In this case, the TA to which the UE 2 has moved can also be considered as belonging to the area of the MME 1.

In particular, according to a legacy scheme, if a UE moves to a neighboring MME from MME coverage to which the UE belongs, a TA list of the UE 2 is updated according to a scheme shown in FIG. 13 (*a*). Yet, in order not to change an MME, it may be able to allocate a TA list as shown in FIG. 13 (*b*). To this end, an MME may be able to include not only information on a TA managed by the MME but also information on a TA shared between neighboring MMEs in advance. Hence, if a UE moves from a shared TA area of the MME to a predetermined neighboring shared TA area, the MME considers it as the UE belongs to the coverage of the MME and may be able to support a D2D operation (e.g., paging). And, if a UE moves from a TA area of a specific MME to a shared TA area of a neighboring MME, the UE can more stay at a network of a legacy MME.

To this end, an MME can transmit a plurality of TA lists instead of a single TA list to a UE registering at the MME in a state that the MME has a plurality of the TA lists. For instance, in FIG. 12, an MME 1 can transmit TA lists described in the following to a UE 1 (via an eNB).

1) TA list 1: TAs dedicated to an MME 1 (e.g., {TA 1, TA 2, TA 3})

2) TA list 2: TAs shared with a neighboring MME (e.g., MME 2) (e.g., {TA 4 and TA 5})

3) TA list 3: TAs shared with a neighboring MME (e.g., MME 3) (e.g., {TA 6, TA 7, TA 8})

4) TA list 4: TA shared with a neighboring MME (e.g., MME 4) (e.g., {TA 9})

In 11, an MME 2 can transmit TA lists described in the following to a UE 2 (via an eNB).

1) TA list 1: TAs dedicated to an MME 2 (e.g., {TA 10, TA 11, TA 12})

2) TA list 2: TAs shared with a neighboring MME (e.g., MME 1) (e.g., {TA 4 and TA 5})

3) TA list 3: TAs shared with a neighboring MME (e.g., MME 5) (e.g., {TA 13, TA 14})

4) TA list 4: TA shared with a neighboring MME (e.g., MME 6) (e.g., {TA 15, TA 16, TA 17})

Figure 14:
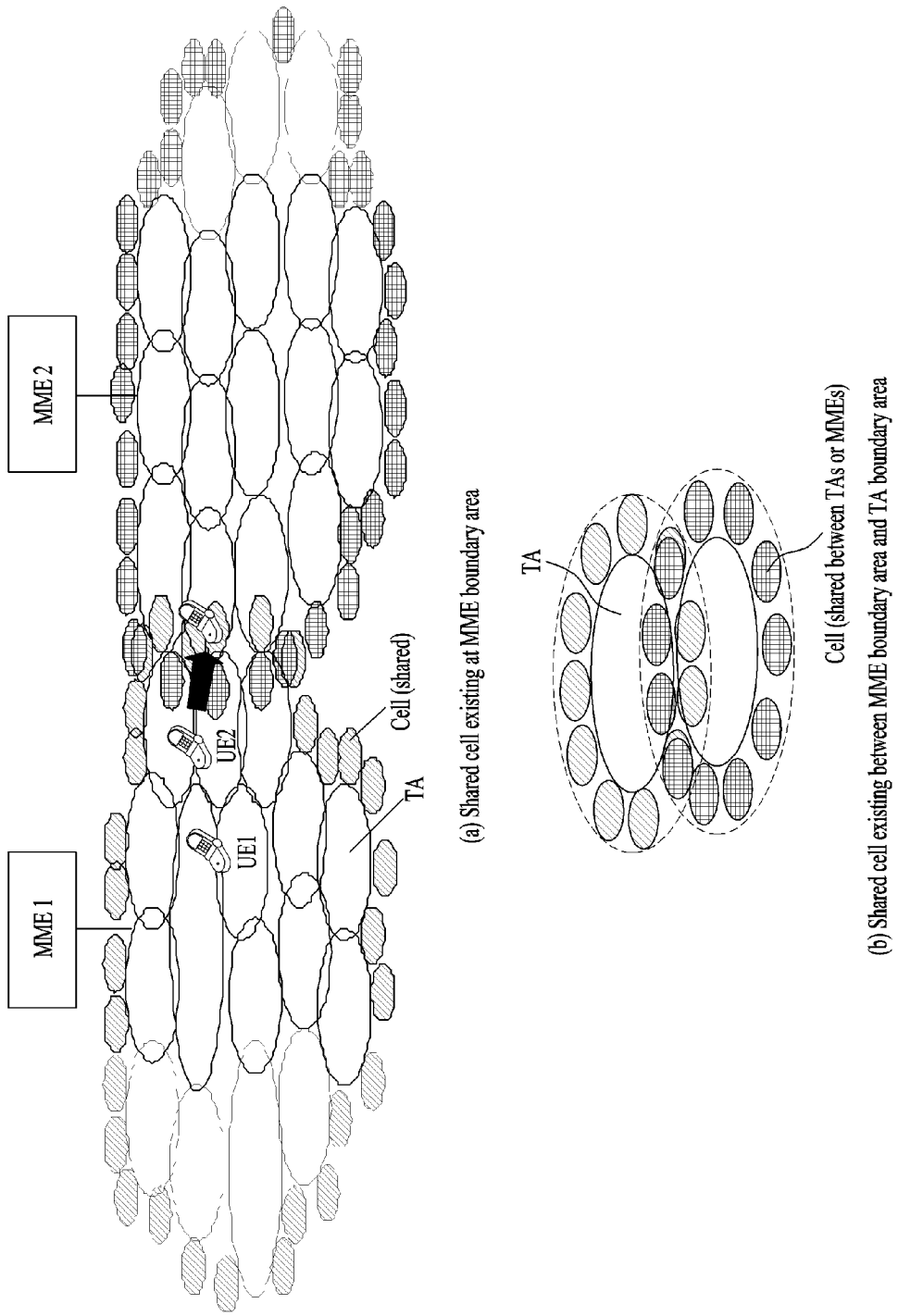

As a second scheme, in order to cope with a case of restricting a physical distance capable of performing D2D, it may consider a scheme of sharing a partial neighboring cell between TAs instead of sharing a TA between neighboring MME areas. Since the aforementioned first scheme includes all possibilities of moving to all cells of a new TA of a neighboring MME, if there is a restriction on D2D coverage, transmit power and the like, it may be not appropriate to apply the first scheme. Meanwhile, since an MME recognizes a UE position in a TA unit, each TA should be able to include a given shared cell. The given shared cell can be defined in advance as a virtual TA for D2D. For instance, in case of a shared TA, each TAI included in a shared TA list may correspond to a single cell or an eNB. Hence, a TA unit (e.g., a TA includes a plurality of eNBs) used for a dedicated TA and a TA unit (e.g., a TA includes a single eNB or a cell) used for a shared TA may be different from each other. FIG. 14 (*a*) and (*b*) show an example for a case of configuring a shared cell. As shown in FIG. 14 (*a*), if a shared cell exists at a boundary area between MMEs only, it may be able to reduce movement of a UE moving between MMEs on the boundary area. As shown in FIG. 14 (*b*), it may be able to additionally configure a shared cell on every boundary of each TA. In this case, although an amount of information to be shared between TAs increases more, a TA update event can be more reduced on a boundary area of a TA.

As a third scheme, it may be able to cope with mobility of an idle state in a manner of configuring a virtual TA for D2D only, a D2D-dedicated paging channel and the like, which are defined irrespective of a legacy TA. Unlike the legacy TA, which is managed by a higher MME end as a unit configured by collecting one or a plurality of eNBs, the D2D virtual TA can be configured by inter-cell cooperation. In case of the D2D virtual TA, information can be shared between corresponding eNBs only without being managed by the higher MME end.

Figure 15:
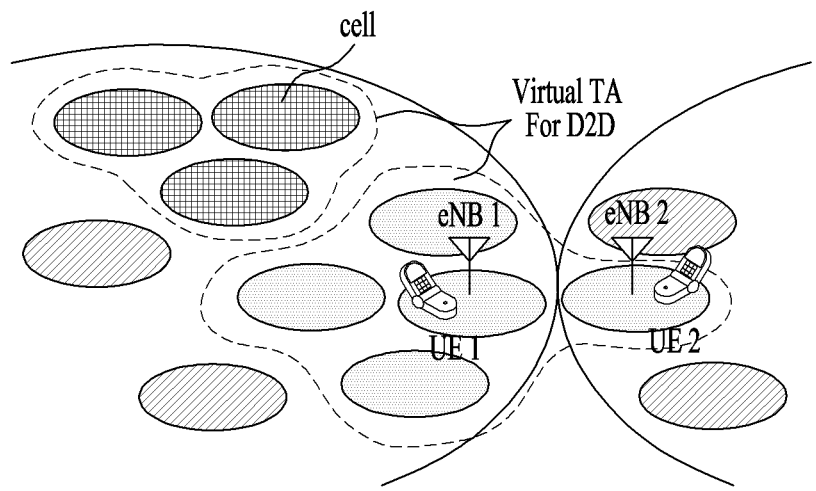

As an example, as shown in FIG. 15, cells configuring a D2D virtual TA may belong to an identical legacy TA area unit (on the basis of a legacy cellular network) or legacy TA area units (on the basis of a legacy cellular network) different from each other. Meanwhile, referring to FIG. 15, a UE (UE 1) communicating with an eNB (eNB 1) belonging to a D2D virtual TA may want to perform D2D communication with a UE (UE 2) communicating with a different eNB (eNB 2) belonging to the D2D virtual TA area. In this case, a serving eNB (eNB 1) of the UE (UE 1), which prefers to perform D2D communication, can inform the UE (UE 2) communicating with the different eNB (eNB 2) of whether D2D communication is performed via a predetermined D2D paging signaling method. And, a transmission range (e.g., a range capable of being configured by a specific D2D virtual TA area) of a D2D paging signal and a resource configuration can be shared with each other between a plurality of eNBs belonging to a specific D2D virtual TA and corresponding information can be informed to each UE via a higher layer signal (or physical layer signal). Similar to the problems mentioned earlier in the foregoing schemes, a concept of a shared cell can also be introduced between virtual TAs for a case that a UE is getting out of a virtual TA. Yet, if an idle UE (UE 2) is getting out of a range capable of performing inter-cell cooperative communication, i.e., a virtual TA (including a shared cell), it can be considered as a paging message is not received in response to a D2D request. In this case, if the UE 2 is not return to a virtual TA to which the UE 1 belongs within a given time, a D2D communication between UEs (e.g., a D2D communication between UE 1 and UE 2) can be terminated.

When the aforementioned schemes are applied, if TAU is not performed despite a UE in which mobility has occurred moves to an area of a neighboring MME, such information as paging and the like supposed to be received from a new MME may not be received. Hence, it may be able to consider a scheme described in the following instead of the paging operation of the new MME. In this case, for clarity, a channel configured to transmit a paging message for D2D traffic is called a D2D paging channel. The D2D paging channel can be used in a manner of reutilizing a legacy LTE paging channel or can be newly defined for D2D.

1) A client UE (RRC-connected, intra (old) MME) can directly transmit a D2D paging channel (i.e., a paging message) to a server UE (idle, out of (old) MME). In particular, the client UE can wake the nearly positioned (as close as the extent appropriate for D2D communication) server UE up in a manner of directly transmitting a D2D paging channel to the server UE. Although an operation of the client UE transmitting the D2D paging channel can be determined by the client UE itself based on whether paging is transmitted for stability of the paging channel and prompt connectivity of the paging channel after D2D traffic occurs, an MME to which the client UE belongs thereto or an eNB can indicate the client UE to transmit the paging channel (based on MME mobility and the like) in consideration of power consumption, efficiency and the like.

2) When a UE performs communication with an eNB and the like in a manner of being connected to a cellular network, the UE receives a paging signal from an eNB, i.e., the eNB belonging to a specific TA of a specific MME in an idle state and may be able to wake up on timing when connection is necessary. For instance, if a position of a server UE belongs to a most recently identified TA (belonging to old MME), eNBs can also transmit a D2D paging channel.

In order to page a server UE, it may be able to use either 1) or 2). Or, it may be able to use both 1) and 2).

Meanwhile, if it is necessary to seamlessly perform a cellular communication while a D2D operation is performed, it may be able to consider options described in the following.

Alt 1) It may be able to perform TAU without a difference different from a legacy scheme and a server UE can access and register at a new MME. In this case, 1) at least an LTE paging channel (for cellular communication) can be transmitted from the new MME and 2) D2D paging information can be delivered (from the new MME) via a legacy LTE paging channel or a separate D2D-specific paging channel.

Alt 2) The server UE can perform not only a D2D operation but also a cellular operation in a manner of staying at an old MME and being associated with the old MME. This operation can be maintained until the UE completely moves to the new MME.

The aforementioned description is explained centering on a case that a communication mode of a UE is set to D2D, if the communication mode of the UE is set to non-D2D, the UE can perform TAU process, MME changing and a paging operation according to a legacy process. For instance, the UE receives a single TA list from an MME. If TA information of a current position is not matched with a TA list, the TAU/MME changing process can be performed according to the process mentioned earlier in FIG. 11. And, each TAI included in the TA list corresponds to a single TA and each TA can include a plurality of eNBs. And, if the TA information of the current position is not matched with a legacy TA list, the UE can register at a new MME and may be able to receive a paging message from the new MME. Hence, the TAU process, the MME changing and the paging operation can be adaptively performed according to a communication mode of the UE.

Figure 16:
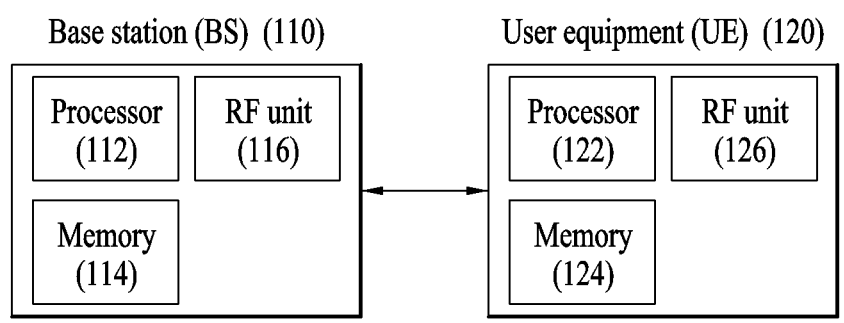
FIG. 16 is a diagram for an example of a base station and a user equipment applicable to the present invention.

FIG. 16 is a diagram for an example of a base station and a user equipment applicable to the present invention. In case that a system includes a relay, the base station or the user equipment can be replaced by the relay.

Referring to FIG. 16, a wireless communication system includes a base station (BS) 110 and a user equipment (UE) 120. The base station 110 includes a processor 112, a memory 114 and a radio frequency (RF) unit 116. The processor 112 can be configured to implement the procedure and/or methods proposed by the present invention. The memory 114 is connected to the processor 112 and configured to store various information related to the operation of the processor 112. The RF unit 116 is connected to the processor 112 and configured to transmit and/or receive a radio signal. The user equipment 120 includes a processor 122, a memory 124 and a radio frequency (RF) unit 126. The processor 122 can be configured to implement the procedure and/or methods proposed by the present invention. The memory 124 is connected to the processor 122 and configured to store various information related to the operation of the processor 122. The RF unit 126 is connected to the processor 122 and configured to transmit and/or receive a radio signal. The base station 110 and/or the user equipment 120 may have a single antenna or multiple antennas.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this specification, embodiments of the present invention are described centering on the signal transmission/reception relations between a user equipment and a base station. In this disclosure, a specific operation explained as performed by a base station can be occasionally performed by an upper node of the base station. In particular, in a network constructed with a plurality of network nodes including a base station, it is apparent that various operations performed for communication with a user equipment can be performed by a base station or other networks except the base station. In this case, 'base station' can be replaced by such a terminology as a fixed station, a Node B, an eNode B (eNB), an access point, and the like. And, 'user equipment' can be replaced by such a terminology as a user equipment (UE), a mobile station (MS), a mobile subscriber station (MSS) and the like.

Embodiments of the present invention can be implemented using various means. For instance, embodiments of the present invention can be implemented using hardware, firmware, software and/or any combinations thereof. In case of the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the means well-known to the public. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Accordingly, the present invention can be used by such a wireless communication device as a user equipment device, a relay, a base station, and the like.

What is claimed is:

1. A method of managing mobility by a user equipment in a wireless communication system, the method comprising:
   receiving a list of a plurality of TAs (tracking areas), wherein the list of a plurality of the TAs comprises a dedicated TA list and a shared TA list; and
   if TA information of a current cell is matched with the shared TA list, selectively performing a TAU (tracking area update) process according to a communication mode,
   wherein if the communication mode corresponds to a non-D2D (device to device) mode, the TAU process is performed for an MME (mobility management entity) corresponding to the TA information of the current cell and wherein if the communication mode corresponds to a D2D mode, the TAU process is skipped.

2. The method of claim 1, wherein the dedicated TA list comprises TA information indicating the user equipment belonging to a registered MME only and wherein the shared TA list comprises TA information indicating the user equipment shared between the registered MME and a neighboring MME.

3. The method of claim 1, wherein the shared TA list comprises a plurality of first TAIs (TA identities) and wherein each of a plurality of the first TAIs corresponds to a single eNode B (eNB) or a cell.

4. The method of claim 3, wherein the dedicated TA list comprises a plurality of second TAIs (TA identities), wherein each of a plurality of the second TAIs corresponds to a single TA and wherein each TA comprises a plurality of eNBs.

5. The method of claim 1, wherein if the TA information of the current cell is matched with the shared TA list, a process of receiving a paging message is performed in consideration of a communication mode, wherein if the communication mode corresponds to the non-D2D mode, the paging message is received from an MME corresponding to the TA information of the current cell and wherein if the communication mode corresponds to the D2D mode, the paging message is received from an MME corresponding to the dedicated TA.

6. The method of claim 1, wherein if the TA information of the current cell is matched with the shared TA list, a process of receiving a paging message is performed in consideration of a communication mode, wherein if the communication mode corresponds to the non-D2D mode, the paging message is received from an MME corresponding to the TA information of the current cell and wherein if the communication mode corresponds to the D2D mode, the paging message is received from a peer D2D user equipment.

7. A user equipment for use in a wireless communication system, the user equipment comprising:
   an RF (radio frequency) unit; and
   a processor, the processor configured to receive a list of a plurality of TAs (tracking areas), wherein the list of a plurality of the TAs comprises a dedicated TA list and a shared TA list, the processor, if TA information of a current cell is matched with the shared TA list, configured to selectively perform a TAU (tracking area update) process according to a communication mode,
   wherein if the communication mode corresponds to a non-D2D (device to device) mode, the TAU process is performed for an MME (mobility management entity) corresponding to the TA information of the current cell and wherein if the communication mode corresponds to a D2D mode, the TAU process is skipped.

8. The user equipment of claim 7, wherein the dedicated TA list comprises TA information indicating the user equipment belonging to a registered MME only and wherein the shared TA list comprises TA information indicating the user equipment shared between the registered MME and a neighboring MME.

9. The user equipment of claim 7, wherein the shared TA list comprises a plurality of first TAIs (TA identities) and wherein each of a plurality of the first TAIs corresponds to a single eNode B (eNB) or a cell.

10. The user equipment of claim 9, wherein the dedicated TA list comprises a plurality of second TAIs (TA identities), wherein each of a plurality of the second TAIs corresponds to a single TA and wherein each TA comprises a plurality of eNBs.

11. The user equipment of claim 7, wherein if the TA information of the current cell is matched with the shared TA list, a process of receiving a paging message is performed in consideration of a communication mode, wherein if the communication mode corresponds to the non-D2D mode, the paging message is received from an MME corresponding to the TA information of the current cell and wherein if the communication mode corresponds to the D2D mode, the paging message is received from an MME corresponding to the dedicated TA.

12. The user equipment of claim 7, wherein if the TA information of the current cell is matched with the shared TA list, a process of receiving a paging message is performed in consideration of a communication mode, wherein if the communication mode corresponds to the non-D2D mode, the paging message is received from an MME corresponding to the TA information of the current cell and wherein if the communication mode corresponds to the D2D mode, the paging message is received from a peer D2D user equipment.

* * * * *